(12) United States Patent
Sugiyama et al.

(10) Patent No.: US 11,466,132 B2
(45) Date of Patent: *Oct. 11, 2022

(54) SHEET FORMED FROM CARBON FIBER REINFORCED THERMOPLASTIC RESIN, AND PRODUCTION METHOD OF SAID SHEET

(71) Applicant: MITSUBISHI GAS CHEMICAL COMPANY, INC., Tokyo (JP)

(72) Inventors: Genki Sugiyama, Tokyo (JP); Kohei Yoshiya, Ibaraki (JP); Hidetaka Shimizu, Ibaraki (JP); Shun Ishikawa, Ibaraki (JP); Hiroyoshi Maruyama, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 325 days.

This patent is subject to a terminal disclaimer.

(21) Appl. No.: 16/608,476

(22) PCT Filed: May 14, 2018

(86) PCT No.: PCT/JP2018/018457
§ 371 (c)(1),
(2) Date: Oct. 25, 2019

(87) PCT Pub. No.: WO2018/216517
PCT Pub. Date: Nov. 29, 2018

(65) Prior Publication Data
US 2020/0277453 A1    Sep. 3, 2020

(30) Foreign Application Priority Data
May 24, 2017 (JP) .............................. JP2017-102251

(51) Int. Cl.
| | |
|---|---|
| *C08J 5/04* | (2006.01) |
| *B32B 27/18* | (2006.01) |
| *B32B 27/36* | (2006.01) |
| *C08J 5/18* | (2006.01) |
| *C08J 5/24* | (2006.01) |

(52) U.S. Cl.
CPC ............... *C08J 5/042* (2013.01); *B32B 27/18* (2013.01); *B32B 27/365* (2013.01); *C08J 5/18* (2013.01); *C08J 5/243* (2021.05); *C08J 2367/03* (2013.01); *C08J 2369/00* (2013.01)

(58) Field of Classification Search
CPC .......... C08G 64/04; C08K 3/04; B32B 27/18; B32B 2262/106; B32B 27/365; C08J 2369/00; C08J 5/042; C08J 5/18; C08J 5/24; C08J 2367/03
USPC ..................................................... 428/299.1
See application file for complete search history.

(56) References Cited

U.S. PATENT DOCUMENTS

| 5,318,847 A | 6/1994 | Fukushima et al. |
| 2010/0173108 A1* | 7/2010 | Nagao .................... C08K 3/041 428/36.9 |
| 2018/0079861 A1 | 3/2018 | Nii et al. |
| 2020/0140635 A1* | 5/2020 | Sugiyama .............. C08G 64/14 |
| 2020/0277462 A1* | 9/2020 | Sugiyama .............. C08G 64/28 |

FOREIGN PATENT DOCUMENTS

| JP | 62-015329 | 1/1987 |
| JP | 05-156081 | 6/1993 |
| JP | 05-263363 | 10/1993 |
| JP | 2005-225993 | 8/2005 |
| JP | 2013-147588 | 8/2013 |
| JP | 2013-256616 | 12/2013 |
| JP | 2015-067812 | 4/2015 |
| JP | 2015-067813 | 4/2015 |
| JP | 2015-203058 | 11/2015 |
| WO | 2016/158843 | 10/2016 |
| WO | 2016/186100 | 3/2018 |

OTHER PUBLICATIONS

Extended European Search Report dated May 15, 2020 in European patent application No. 18806206.1.
Official Communication issued in International Bureau of WIPO Patent Application No. PCT/JP2018/018457, dated Jul. 24, 2018.

* cited by examiner

*Primary Examiner* — Camie S Thompson
(74) *Attorney, Agent, or Firm* — Greenblum & Bernstein, P.L.C.

(57) ABSTRACT

A sheet formed from carbon fiber reinforced thermoplastic resin with high heat resistance, and a production method of said sheet is provided. This sheet is formed from a carbon fiber reinforced thermoplastic resin that contains carbon fibers, dichloromethane, and a thermoplastic resin containing at least one of a polycarbonate resin and a polyarylate resin. The aforementioned at least one of a polycarbonate resin and a polyarylate resin has a constituent unit derived from a dihydric phenol represented by formula (1), and the content of the dichloromethane contained in the sheet is 10-10,000 ppm by mass. (In formula (1), $R_1$-$R_4$ independently represent a hydrogen, a halogen, a nitro, or a methyl group; X represents a divalent group represented by any of formulas (2) to (4).)

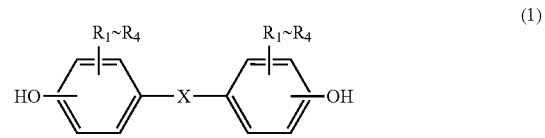

(1)

7 Claims, No Drawings

SHEET FORMED FROM CARBON FIBER REINFORCED THERMOPLASTIC RESIN, AND PRODUCTION METHOD OF SAID SHEET

TECHNICAL FIELD

The present invention relates to a sheet formed from a carbon fiber reinforced thermoplastic resin, which can favorably be used as an aircraft part, a spacecraft part, an automobile part, a watercraft part, an electronic device part, a sports-related part or the like, and to a method for producing said sheet.

BACKGROUND ART

Since carbon fibers, glass fibers and aramid fibers are excellent in elastic modulus and strength with a lower density as compared to metals, composite materials obtained by combining these fibers with various matrix resins are used in many fields such as aircraft parts, spacecraft parts, automobile parts, watercraft parts, construction materials and sporting goods. In particular, a carbon fiber reinforced resin (CFRP) which is a composite material consisting of a combination of carbon fibers and an epoxy resin or an unsaturated polyester resin is widely used.

Although carbon fiber reinforced resins that have a conventional thermosetting resin as the matrix are disadvantageous as they require a great deal of time for thermosetting, carbon fiber reinforced thermoplastic resins that have a thermoplastic resin as the matrix (hereinafter, sometimes referred to as "CFRTP") have recently been developed in the expectation for use as a composite material that allows high-cycle molding.

While a short fiber reinforced thermoplastic resin that allows molding of a complicated shape has already been put to practical use, it is disadvantageous for having the problem of significantly low elastic modulus as compared to lightweight metals due to the short fiber length of the reinforcement fibers. Therefore, there is a strong demand for a continuous fiber reinforced thermoplastic resin.

For the purpose of providing a molded product of a continuous fiber reinforced thermoplastic resin from a thermoplastic resin which is reinforced with continuous fibers, typically carbon fibers with good mechanical properties, Patent document 1 discloses a method for producing a continuous fiber reinforced thermoplastic resin, the method comprising the steps of: impregnating a solvent into continuous fibers in advance (Step A); immersing the continuous fibers impregnated with the solvent in a solution obtained by dissolving a thermoplastic resin having a fluorene-containing dihydroxy compound as a monomer constituent unit in a solvent (Step B); and evaporating the solvent by heating the reinforcement fibers impregnated with the solvent to obtain a continuous fiber reinforced thermoplastic resin (Step C).

Although the continuous fiber reinforced thermoplastic resin obtained in Patent document 1 has good mechanical properties, it requires further improvement in heat resistance.

PRIOR ART DOCUMENTS

Patent Documents

Patent document 1: Japanese Patent Laid-open Publication No. 2015-203058

SUMMARY OF THE INVENTION

Problems to be Solved by the Invention

The present invention has an objective of providing a sheet formed from a carbon fiber reinforced thermoplastic resin having excellent heat resistance (with less amount of heat deformation under a high temperature environment), and a method for producing said sheet.

Means for Solving the Problems

The present inventors have gone through intensive studies to solve the aforementioned problem, and as a result of which found that a thermoplastic resin comprising at least one of a polycarbonate resin and a polyarylate resin having a specified structure can be used to obtain a sheet from a carbon fiber reinforced thermoplastic resin having excellent heat resistance, thereby accomplishing the present invention. Thus, the above-mentioned problem can be solved by the present invention hereinbelow.

<1> A sheet formed from a carbon fiber reinforced thermoplastic resin comprising carbon fibers, dichloromethane and a thermoplastic resin containing at least one of a polycarbonate resin and a polyarylate resin, wherein at least one of the polycarbonate resin and the polyarylate resin has a constituent unit derived from a dihydric phenol represented by General formula (1) below, and the content of dichloromethane contained in the sheet is 10-10,000 ppm by mass:

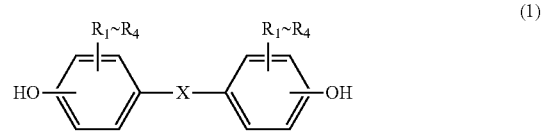

(in General formula (1), $R_1$-$R_4$ each independently represent hydrogen, a halogen, a nitro or a methyl group; and X represents a divalent group represented by any of Formulae (2) to (4) below).

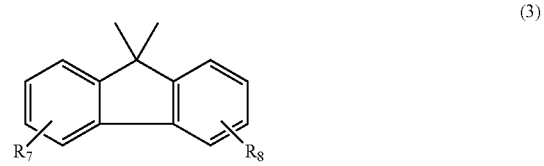

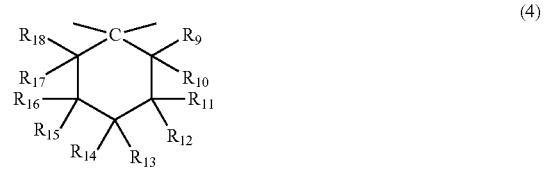

(in Formula (2), $R_5$ represents hydrogen, a halogen, an optionally substituted C1-C5 alkyl group, an optionally substituted C1-C5 alkoxy group, an optionally substituted C6-C12 aryl group, an optionally substituted C7-C17 aralkyl group or an optionally substituted C2-C5 alkenyl group while $R_6$ represents an optionally substituted C6-C12 aryl group or an optionally substituted C7-C17 aralkyl group, or $R_5$ and $R_6$ bond with each other to form a C5-C20 carbon ring; and c represents an integer of 1-5;

in Formula (3), $R_7$ and $R_8$ each independently represent hydrogen, a halogen, an optionally substituted C1-C5 alkyl group, an optionally substituted C1-C5 alkoxy group, an optionally substituted C6-C12 aryl group or an optionally substituted C7-C17 aralkyl group, or $R_7$ and $R_8$ bond with each other to form a C5-C20 carbon ring; and in Formula (4), $R_9$-$R_{18}$ each independently represent hydrogen (a hydrogen atom) or a C1-C3 alkyl group, where at least one of $R_9$-$R_{18}$ represents a C1-C3 alkyl group).

<2> The sheet according to <1> above, wherein the carbon fibers are continuous fibers.

<3> The sheet according to either one of <1> and <2> above, wherein the sheet comprises the carbon fibers for 20-80 vol % and the thermoplastic resin for 80-20 vol %.

<4> The sheet according to any one of <1> to <3> above, wherein the viscosity-average molecular weight of the polycarbonate resin and the polyarylate resin is 10,000-100,000.

<5> A laminate sheet obtained by laminating the sheet according to any one of <1> to <4> above.

<6> A method for producing a carbon fiber reinforced thermoplastic resin sheet, the method comprising the steps of:

producing a thermoplastic resin solution by an interfacial polymerization process by dissolving a thermoplastic resin containing at least one of a polycarbonate resin and a polyarylate resin in dichloromethane;

impregnating the thermoplastic resin solution into carbon fibers; and evaporating dichloromethane from the carbon fibers impregnated with the thermoplastic resin solution, wherein at least one of the polycarbonate resin and the polyarylate resin has a constituent unit derived from a dihydric phenol represented by General formula (1) below:

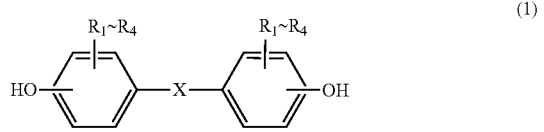

(1)

(in General formula (1), $R_1$-$R_4$ each independently represent hydrogen (a hydrogen atom), a halogen, a nitro or a methyl group; and X represents a divalent group represented by any of Formulae (2) to (4) below):

(2)

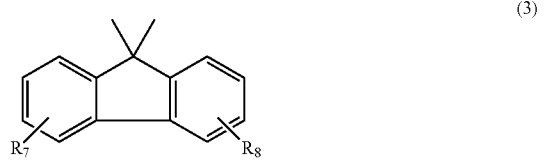

(3)

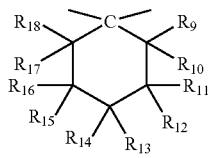

(4)

(in Formula (2), $R_5$ represents hydrogen (a hydrogen atom), a halogen, an optionally substituted C1-C5 alkyl group, an optionally substituted C1-C5 alkoxy group, an optionally substituted C6-C12 aryl group, an optionally substituted C7-C17 aralkyl group or an optionally substituted C2-C5 alkenyl group while $R_6$ represents an optionally substituted C6-C12 aryl group or an optionally substituted C7-C17 aralkyl group, or $R_5$ and $R_6$ bond with each other to form a C5-C20 carbon ring; and c represents an integer of 1-5;

in Formula (3), $R_7$ and $R_8$ each independently represent hydrogen (a hydrogen atom), a halogen, an optionally substituted C1-C5 alkyl group, an optionally substituted C1-C5 alkoxy group, an optionally substituted C6-C12 aryl group or an optionally substituted C7-C17 aralkyl group, or $R_7$ and $R_8$ bond with each other to form a C5-C20 carbon ring; and in Formula (4), $R_9$-$R_{18}$ each independently represent hydrogen (a hydrogen atom) or a C1-C3 alkyl group, where at least one of $R_9$-$R_{18}$ represents a C1-C3 alkyl group).

<7> The production method according to <6> above, wherein the concentration of the polycarbonate resin and the polyarylate resin in the thermoplastic resin solution is 10-30 mass %.

Advantageous Effect of the Invention

According to the present invention, a thermoplastic resin containing at least one of a polycarbonate resin and a polyarylate resin having a specified structure can be used to produce a sheet formed from the carbon fiber reinforced thermoplastic resin having excellent heat resistance. In comparison to general polycarbonate and polyarylate resins, a carbon fiber reinforced thermoplastic resin produced by impregnating with the thermoplastic resin containing at least one of the polycarbonate resin and the polyarylate resin having a specified structure of the present invention shows a higher thermophysical value that corresponds to the load deflection temperature and does not deform even under a high temperature environment, and thus it is highly resistant to heat.

EMBODIMENTS FOR CARRYING OUT THE INVENTION

Hereinafter, the present invention will be detailed by illustrating a production example, examples and the like, although the present invention is not limited to the illustrated production example or examples, and can be carried out by any alternative method as long as it does not depart from the scope of the present invention.

The sheet of the present invention is a sheet formed from a carbon fiber reinforced thermoplastic resin comprising carbon fibers, dichloromethane and a thermoplastic resin containing at least one of a polycarbonate resin and a polyarylate resin, wherein at least one of the polycarbonate resin and the polyarylate resin has a constituent unit derived from a dihydric phenol represented by General formula (1) above, and the content of dichloromethane contained in the sheet is 10-10,000 ppm by mass.

<Carbon Fibers>

The carbon fibers used for the present invention are preferably continuous fibers. The average fiber length of the continuous fibers is preferably 10 mm or longer and more preferably 30 mm or longer. In addition, the continuous fibers may take a form of a unidirectional sheet, a woven sheet, a multiaxial laminate sheet or the like.

While the number of single fibers included in a fiber bundle (filament), the number of filaments included in a bundle of filaments (tow) and the structure thereof may vary depending on the carbon fibers, the number of single fibers, the number of filaments and the structure thereof according to the present invention are not limited and various carbon fibers may be used.

The proportion of the carbon fibers in the carbon fiber reinforced thermoplastic resin of the present invention is preferably 20-80 vol %, and more preferably 30-70 vol % and still more preferably 40-60 vol % from the viewpoint of the mechanical properties of the carbon fiber reinforced thermoplastic resin.

<Thermoplastic Resin>

At least one of the polycarbonate resin and the polyarylate resin contained in the thermoplastic resin used for the present invention has a constituent unit derived from a dihydric phenol represented by General formula (1) below, where either a homopolymer or a copolymer may be used.

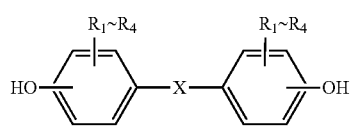

(1)

In General formula (1), $R_1$-$R_4$ each independently represent hydrogen, a halogen, a nitro or a methyl group, where it preferably represents hydrogen or a methyl group from the viewpoint of the availability of the raw material.

In General formula (1), X represents a divalent group represented by any one of Formulae (2) to (4) below.

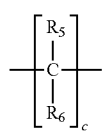

(2)

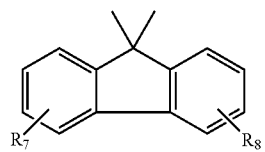

(3)

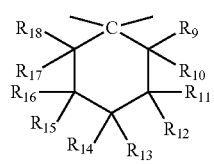

(4)

In Formula (2), $R_5$ represents hydrogen, a halogen, an optionally substituted C1-C5 alkyl group, an optionally substituted C1-C5 alkoxy group, an optionally substituted C6-C12 aryl group, an optionally substituted C7-C17 aralkyl group or an optionally substituted C2-C5 alkenyl group while R % represents an optionally substituted C6-C12 aryl group or an optionally substituted C7-C17 aralkyl group, or $R_5$ and $R_6$ bond with each other to form a C5-C20 carbon ring.

From the viewpoint of the availability of the raw material, $R_5$ preferably represents a C1-C3 alkyl group or a C6-C12 aryl group.

From the viewpoint of the availability of the raw material, $R_6$ preferably represents a C6-C12 aryl group.

In addition, from the viewpoint of the availability of the raw materials, $R_5$ and $R_6$ preferably bond with each other to form a C6-C12 carbon ring.

c represents an integer of 1-5 and preferably represents 1 or 2 from the viewpoint of the availability of the raw material.

In Formula (3), $R_7$ and $R_8$ each independently represent hydrogen, a halogen, an optionally substituted C1-C5 alkyl group, an optionally substituted C1-C5 alkoxy group, an optionally substituted C6-C12 aryl group or an optionally substituted C7-C17 aralkyl group, or $R_7$ and $R_8$ bond with each other to form a C5-C20 carbon ring.

From the viewpoint of the availability of the raw material, $R_7$ preferably represents hydrogen or a methyl group.

From the viewpoint of the availability of the raw material, $R_8$ preferably represents hydrogen or a methyl group.

In addition, from the viewpoint of the availability of the raw materials, $R_7$ and $R_8$ preferably bond with each other to form a C5-C12 carbon ring.

In Formula (4), $R_9$-$R_{18}$ each independently represent hydrogen or a C1-C3 alkyl group, where at least one of $R_9$-$R_{18}$ represents a C1-C3 alkyl group.

From the viewpoint of the availability of the raw materials, $R_9$-$R_{18}$ preferably each independently represent hydrogen or a methyl group.

At least one of the polycarbonate resin and the polyarylate resin contained in the thermoplastic resin used for the present invention preferably contains a constituent unit derived from a dihydric phenol represented by General formula (1) above for 20-100 mass %, more preferably for 40-100 mass %, and particularly preferably for 60-100 mass %, from the viewpoint of the heat resistance of the resulting carbon fiber reinforced thermoplastic resin. If at least one of the polycarbonate resin and the polyarylate resin is a copolymer, a constituent unit other than the constituent unit represented by General formula (1) above may be contained without impairing the effect of the present invention.

Specific examples of the monomer constituting the polycarbonate resin which can particularly preferably be used for the present invention include, but not limited to, 1,1-bis(4-hydroxyphenyl)-1-phenylethane (BPAP), 1,1-bis(4-hydroxyphenyl)cyclododecane (HPCD), 1,1-bis(4-hydroxyphenyl)cyclohexane (BPZ), 9,9-bis(4-hydroxy-3-methylphenyl)fluorene (BCFL) and bis(4-hydroxyphenyl) diphenylmethane (BPBP) from the viewpoint of the availability of the raw material.

The polycarbonate resin used for the present invention preferably has a viscosity-average molecular weight of 10,000-100,000, more preferably 14,000-60,000 and still more preferably 16,000-40,000 so as to have a solution viscosity that allows easy handling of the resin as a solution.

Specific examples of monomers constituting the polyarylate resin which can particularly preferably be used for the present invention include, but not limited to, 1,1-bis(4-hydroxyphenyl)-1-phenylethane (BPAP), 1,1-bis(4-hydroxyphenyl)cyclododecane (HPCD), 1,1-bis(4-hydroxyphenyl)cyclohexane (BPZ), 9,9-bis(4-hydroxy-3-methylphenyl)fluorene (BCFL) and bis(4-hydroxyphenyl) diphenylmethane (BPBP) from the viewpoint of the availability of the raw material.

The polyarylate resin used for the present invention preferably has a viscosity-average molecular weight of 10,000-100,000, more preferably 14,000-60,000 and still more preferably 16,000-40,000 so as to have a solution viscosity that allows easy handling of the resin as a solution.

As long as the effect of the present invention is exhibited, the thermoplastic resin may contain a component other than at least one of the polycarbonate resin and the polyarylate resin, and may be blended with other resin and various additives such as a mold release agent, a flame retardant, an antioxidant, a heat stabilizer, a flame retardant auxiliary, an ultraviolet absorber, a colorant, an antistatic agent, a fluorescent bleach, an anti-fog agent, a fluidity improving agent, a plasticizer, a dispersant and an antibacterial agent.

Examples of other resin include polycarbonate resins other than the polycarbonate resin used according to the present invention, polyarylate resins other than the polyarylate resin used according to the present invention, thermoplastic polyester resins such as a polyethylene terephthalate resin (PET resin), polytrimethylene terephthalate (PTT resin) and a polybutylene terephthalate resin (PBT resin); styrene-based resins such as a polystyrene resin (PS resin), a high impact polystyrene resin (HIPS), an acrylonitrile-styrene copolymer (AS resin) and a methyl methacrylate-styrene copolymer (MS resin); elastomers such as a core-shell structured elastomer like a methyl methacrylate-acrylic rubber-styrene copolymer (MAS) and a polyester-based elastomer; polyolefin resins such as a cyclic cycloolefin resin (COP resin) and a cyclic cycloolefin (COP) copolymer resin; a polyamide resin (PA resin); a polyimide resin (PI resin); a polyetherimide resin (PEI resin); a polyurethane resin (PU resin); a polyphenylene ether resin (PPE resin); a polyphenylene sulfide resin (PPS resin); a polysulfone resin (PSU resin); a polymethacrylate resin (PMMA resin); and polycaprolactone.

The proportion of these components in 100 mass % of the thermoplastic resin is preferably 0-50 mass % and more preferably 0-20 mass %.

<Dichloromethane>

The sheet of the present invention is characterized in that the content of dichloromethane contained in the sheet is 10-10,000 ppm by mass. The content of dichloromethane contained in the sheet is preferably 10-5,000 ppm by mass, and more preferably 10-1,000 ppm by mass. If the content of dichloromethane exceeds 10,000 ppm by mass, gas may be generated upon heat processing the sheet of the present invention by press molding or the like due to dichloromethane contained, or the sheet may have poor appearance (void) after the heat processing.

The method for measuring the content of dichloromethane contained in the sheet of the present invention is described in the later-described examples.

According to the present invention, the process for adjusting the content of dichloromethane contained in the sheet to 10-10,000 ppm by mass and acquiring good sheet appearance at the same time may be, for example, to adjust the drying temperature and the drying time in the step of evaporating dichloromethane from the carbon fibers impregnated with the thermoplastic resin solution obtained by dissolving the thermoplastic resin containing at least one of the polycarbonate resin and the polyarylate resin in dichloromethane. Specifically, dichloromethane is preferably evaporated to some degree, for example, by drying without external heating (e.g., air drying) or with a little aid of external heating, and then drying with an aid of external heating. Air drying may be carried out by simply leaving the carbon fiber at room temperature, where air may be sent to speed up the drying.

<Carbon Fiber Reinforced Thermoplastic Resin>

The proportion of the carbon fibers and the thermoplastic resin in the carbon fiber reinforced thermoplastic resin of the present invention is preferably such that the carbon fibers account for 20-80 vol % while the thermoplastic resin accounts for 80-20 vol %, more preferably such that the carbon fibers account for 30-70 vol % while the thermoplastic resin accounts for 70-30 vol %, and still more preferably such that the carbon fibers account for 40-60 vol % while the thermoplastic resin accounts for 60-40 vol % from the viewpoint of the mechanical strength of the carbon fiber reinforced thermoplastic resin.

If the proportion of the carbon fibers falls below this range, the mechanical properties of the carbon fiber reinforced thermoplastic resin will be equal to or poorer than those of lightweight metals. On the other hand, if the proportion of the carbon fibers exceeds this range, the amount of the resin will be small and thus the action of the matrix resin to bundle the carbon fibers may not be effective, in which case the mechanical strength is deteriorated.

The carbon fiber reinforced thermoplastic resin of the present invention may contain a component other than the carbon fibers, the thermoplastic resin and dichloromethane. Examples of such component include other resin and various additives such as a mold release agent, a flame retardant, an antioxidant, a heat stabilizer, a flame retardant auxiliary, an ultraviolet absorber, a colorant, an antistatic agent, a fluorescent bleach, an anti-fog agent, a fluidity improving agent, a plasticizer, a dispersant and an antibacterial agent.

<Sheet and Laminate Sheet>

While the thickness of the sheet of the present invention is not particularly limited, it is preferably 0.01 mm-1 mm and more preferably 0.05 mm-0.5 mm.

An example of the method for producing a laminate sheet by laminating the sheet of the present invention includes a press molding method.

<Method for Producing Carbon Fiber Reinforced Thermoplastic Resin Sheet>

A method for producing a carbon fiber reinforced thermoplastic resin sheet of the present invention comprises the steps of: producing a thermoplastic resin solution by an interfacial polymerization process by dissolving a thermoplastic resin containing at least one of a polycarbonate resin and a polyarylate resin in dichloromethane; impregnating the thermoplastic resin solution into carbon fibers; and evaporating dichloromethane from the carbon fibers impregnated with the thermoplastic resin solution, wherein at least one of the polycarbonate resin and the polyarylate resin has a constituent unit derived from a dihydric phenol represented by General formula (1) above.

According to the production method of the present invention, the concentration of the polycarbonate resin in the thermoplastic resin solution is preferably 10-30 mass %, and more preferably 12-25 mass %. If the concentration of the polycarbonate resin is lower than 10 mass %, bubbling may occur during drying in the subsequent step whereas if the concentration is higher than 30 mass %, the solution viscosity may become significantly high which could render handling in the impregnating step difficult.

Moreover, according to the production method of the present invention, the concentration of the polyarylate resin in the thermoplastic resin solution is preferably 10-30 mass %, and more preferably 12-25 mass %. If the concentration of the polyarylate resin is lower than 10 mass %, bubbling may occur during drying in the subsequent step whereas if the concentration is higher than 30 mass %, the solution viscosity may become significantly high which could render handling in the impregnating step difficult.

(Step of Producing Thermoplastic Resin Solution)

For the reaction of the interfacial polymerization process, reactants including a dihydric phenol, a monohydric phenol as a chain terminator and, if necessary, an antioxidant used for preventing oxidation of the dihydric phenol and phosgene or triphosgene as a carbonate binder, are mixed in the presence of dichloromethane and an alkaline aqueous solution while keeping normal pH at 10 or higher. Thereafter, a polymerization catalyst such as a tertiary amine or a quaternary ammonium salt is added to carry out the interfacial polymerization and the resulting resin solution is purified to give a polycarbonate resin solution. The timing of adding the chain terminator is not particularly limited as long as it is added at some point between the phosgenation to the start of the polymerization reaction. Here, the reaction temperature is 0-35° C. and the reaction time is several minutes to several hours.

(Impregnating Step)

This is a step of impregnating the polycarbonate resin solution according to the present invention into carbon fibers. The impregnating method is not particularly limited, and various methods such as a method of immersing the fibers in a tank containing the solution, a method of passing the fibers through a spray of the solution atomized in a tank, or a method of spraying the solution to the fibers may be employed. Among them, the method of immersing the fibers in a tank containing the solution is favorable since it is most convenient and allows uniform application of the solution.

(Evaporation (Drying) Step)

This is a step of evaporating dichloromethane from the carbon fibers impregnated with the thermoplastic resin solution such as the polycarbonate resin solution. Dichloromethane is preferably evaporated to some degree, for example, by subjecting it to drying without external heating (e.g., air drying) or with a little aid of external heating, and then to drying with an aid of external heating. Air drying may be carried out by simply leaving the carbon fiber at room temperature, where air may be sent to speed up the drying.

EXAMPLES

Hereinafter, the present invention will be described specifically by way of examples and comparative examples. The embodiments may appropriately be altered as long as the effect of the invention is achieved.

<Conditions for Measuring Viscosity-Average Molecular Weight (Mv)>

Measurement instrument: Ubbelohde capillary viscometer

Solvent: Dichloromethane

Concentration of resin solution: 0.5 grams/deciliter

Measurement temperature: 25° C.

Subsequent to a measurement under the above conditions, the intrinsic viscosity [η] deciliter/gram is determined at a Huggins coefficient of 0.45 to calculate the viscosity-average molecular weight by the following equation.

$$\eta = 1.23 \times 10^{-} \times Mv^{0.83}$$

<Conditions for Measuring Content of Dichloromethane>

Measurement instrument: Gas chromatograph (GC-2014 manufactured by Shimadzu Corporation)

Solvent: Chloroform

Concentration of carbon fiber reinforced thermoplastic resin solution: 2 grams/20 milliliters Sample vaporization chamber: 200° C., 252 kPA Column: 60° C. at the start of measurement, 120° C. at the end of measurement, measurement time 10 minutes Detector: 320° C.

Subsequent to a measurement under the above conditions, a peak area at a retention time of 4.4 minutes was determined to calculate the content of dichloromethane based on the separately calculated calibration curve.

<Conditions for Measuring Carbon Fiber Content (Vf)>

The carbon fiber content (Vf) was measured based on JIS K 7075.

<Conditions for Measuring Amount of Heat Deformation>

Test piece: 80 mm×10 mm

Load: 5 g counterweight (diameter 8 mm)

Test tank: Natural-convection-type thermostatic dryer

Distance between support points: 60 mm

Both ends of a test piece were placed on a frame for 10 mm each without fixing (support points), a 5 g counterweight was placed as a load on the center of the test piece, and the resultant was heat treated at a predetermined temperature for a minute. The heat-treated test piece was taken out from the test tank to measure the difference in heights resulting from the deformation between the both ends and the center of the test piece as an amount of heat deformation.

Example 1

(Step of Producing Polycarbonate Resin Solution)

100 g (0.34 mol) of 1,1-bis(4-hydroxyphenyl)-1-phenylethane (BPAP) manufactured by Honshu Chemical Industry and 0.3 g of hydrosulfite as an antioxidant were added to and dissolved in 510 ml of a 9 w/w % aqueous sodium hydroxide solution. To this, 400 ml of dichloromethane was added, and 47.7 g of phosgene was blown into the resultant by spending 30 minutes while stirring and keeping the solution temperature in a range of 15° C.–25° C.

After the phosgene blowing, 100 ml of a 9 w/w % aqueous sodium hydroxide solution and a solution obtained by dissolving 2.02 g (0.013 mol) of p-tert-butylphenol in 55 ml of dichloromethane were added and vigorously stirred for emulsification. Thereafter, 0.2 ml of triethylamine as a polymerization catalyst was added to allow polymerization for about 40 minutes.

The polymerization solution was separated into a water phase and an organic phase, the organic phase was neutralized with phosphoric acid and repeatedly rinsed with pure water until the pH of the rinsing solution became neutral. The concentration of the purified polycarbonate resin solution was 15 mass %.

The resulting polycarbonate resin solution was used to measure the viscosity-average molecular weight, which turned out to be 21,000.

(Impregnating and Drying Steps)

A carbon fiber textile (TORAYCA cloth C06347B manufactured by Toray Industries) was cut into a size of 10 cm×10 cm, which was impregnated with the polycarbonate resin solution in an impregnation tank. At the end of the impregnation, the resultant was dried in a thermostatic chamber at 250° C. for 5 hours, and then dried in a hot air dryer at 100° C. for 2 hours to give a carbon fiber reinforced thermoplastic resin.

The carbon fiber content (Vf) of the resulting carbon fiber reinforced thermoplastic resin was 51 vol %. The resulting carbon fiber reinforced thermoplastic resin was used to measure the dichloromethane content, which turned out to be 440 ppm by mass. The thickness of the resulting carbon fiber reinforced thermoplastic resin was 0.283 mm.

(Evaluation of Appearance Before Molding)

The resulting carbon fiber reinforced thermoplastic resin was observed with an optical microscope, where no whitening or lifting was found on the surface of the resin and thus the appearance was "good".

(Evaluation of Appearance after Molding)

The resulting carbon fiber reinforced thermoplastic resin was pressed at 100 kgf for 5 minutes while being heated at 265° C. to obtain a sheet for evaluating the appearance. No void was found in the resulting sheet for evaluating the appearance, and thus the appearance was "good". The results are summarized in Table 1.

(Evaluation of Amount of Heat Deformation)

Test pieces were cut out from the resulting carbon fiber reinforced thermoplastic resin, where the amount of heat deformation measured at 170° C. was 1 mm or less. The amount of heat deformation similarly measured at 180° C. was 2 mm. The amount of heat deformation similarly measured at 190° C. was 4 mm. The amount of heat deformation similarly measured at 195° C. was 12 mm. The results are summarized in Table 2.

Example 2

(Steps of Producing Polycarbonate Resin Solution, Impregnating and Drying)

A carbon fiber reinforced thermoplastic resin was obtained by using the polycarbonate resin solution obtained in Example 1 and operating in the same manner as Example 1 except that drying was conducted at the end of the impregnation in a thermostatic chamber at 25° C. for 5 hours and then in a hot air dryer at 100° C. for an hour.

The carbon fiber content (Vf) of the resulting carbon fiber reinforced thermoplastic resin was 49 vol %. The resulting carbon fiber reinforced thermoplastic resin was used to measure the dichloromethane content, which turned out to be 1,150 ppm by mass. The thickness of the resulting carbon fiber reinforced thermoplastic resin was 0.275 mm.

(Evaluation of Appearance Before Molding)

The resulting carbon fiber reinforced thermoplastic resin was observed with an optical microscope, where no whitening or lifting was found on the surface of the resin and thus the appearance was "good".

(Evaluation of Appearance after Molding)

The resulting carbon fiber reinforced thermoplastic resin was pressed at 100 kgf for 5 minutes while being heated at 265° C. to obtain a sheet for evaluating the appearance. No void was found in the resulting sheet for evaluating the appearance, and thus the appearance was "good". The results are summarized in Table 1.

Example 3

(Steps of Producing Polycarbonate Resin Solution, Impregnating and Drying)

A carbon fiber reinforced thermoplastic resin was obtained by using the polycarbonate resin solution obtained in Example 1 and operating in the same manner as Example 1 except that drying was conducted at the end of the impregnation in a thermostatic chamber at 25° C. for 5 hours and then in a hot air dryer at 100° C. for 10 minutes.

The carbon fiber content (Vf) of the resulting carbon fiber reinforced thermoplastic resin was 48 vol %. The resulting carbon fiber reinforced thermoplastic resin was used to measure the dichloromethane content, which turned out to be 6,300 ppm by mass. The thickness of the resulting carbon fiber reinforced thermoplastic resin was 0.277 mm.

(Evaluation of Appearance Before Molding)

The resulting carbon fiber reinforced thermoplastic resin was observed with an optical microscope, where no whitening or lifting was found on the surface of the resin and thus the appearance was "good".

(Evaluation of Appearance after Molding)

The resulting carbon fiber reinforced thermoplastic resin was pressed at 100 kgf for 5 minutes while being heated at 265° C. to obtain a sheet for evaluating the appearance. No void was found in the resulting sheet for evaluating the appearance, and thus the appearance was "good". The results are summarized in Table 1.

Example 4

(Steps of Producing Polycarbonate Resin Solution, Impregnating and Drying)

A 15 mass % polycarbonate resin solution and a carbon fiber reinforced thermoplastic resin were obtained by operating in the same manner as Example 1 except that 100 g (0.34 mol) of 1,1-bis(4-hydroxyphenyl)-1-phenylethane (BPAP) in Example 1 was changed to 92 g (0.34 mol) of 1,1-bis(4-hydroxyphenyl)cyclohexane (BPZ) and the solution obtained by dissolving 2.02 g (0.013 mol) of p-tert-butylphenol in 55 ml of dichloromethane was changed to a solution obtained by dissolving 1.688 g (0.011 mol) of p-tert-butylphenol in 18 ml of dichloromethane.

The resulting polycarbonate resin solution was used to measure the viscosity-average molecular weight, which turned out to be 21,200.

The carbon fiber content (Vf) of the resulting carbon fiber reinforced thermoplastic resin was 53 vol %. The resulting carbon fiber reinforced thermoplastic resin was used to measure the dichloromethane content, which turned out to be 550 ppm by mass. The thickness of the resulting carbon fiber reinforced thermoplastic resin was 0.261 mm.

(Evaluation of Appearance Before Molding)

The resulting carbon fiber reinforced thermoplastic resin was observed with an optical microscope, where no whitening or lifting was found on the surface of the resin and thus the appearance was "good".

(Evaluation of Appearance after Molding)

The resulting carbon fiber reinforced thermoplastic resin was pressed at 100 kgf for 5 minutes while being heated at 265° C. to obtain a sheet for evaluating the appearance. No void was found in the resulting sheet for evaluating the appearance, and thus the appearance was "good". The results are summarized in Table 1.

(Evaluation of Amount of Heat Deformation)

Test pieces were cut out from the resulting carbon fiber reinforced thermoplastic resin, where the amount of heat deformation measured at 160° C. was 1 mm or less. The amount of heat deformation similarly measured at 170° C. was 2 mm. The amount of heat deformation similarly measured at 180° C. was 4 mm. The amount of heat deformation similarly measured at 190° C. was 9 mm. The amount of heat deformation similarly measured at 195° C. was 11 mm. The results are summarized in Table 2.

Example 5

(Step of Producing Polycarbonate Resin Solution)

100 g (0.28 mol) of 1,1-bis(4-hydroxyphenyl)cyclododecane (HPCD) manufactured by Honshu Chemical Industry and 0.5 g of hydrosulfite as an antioxidant were added to and dissolved in 1,050 ml of a 9 w/w % aqueous sodium hydroxide solution. To this, 300 ml of dichloromethane was added, and 45.0 g of phosgene was blown into the resultant by spending 30 minutes while stirring and keeping the solution temperature in a range of 15° C.–25° C.

After the phosgene blowing, a solution obtained by dissolving 0.94 g (0.006 mol) of p-tert-butylphenol in 30 ml of dichloromethane was added and vigorously stirred for emulsification. Thereafter, 0.5 ml of triethylamine was added as a polymerization catalyst was added to allow polymerization for about 40 minutes.

At the end of the polymerization, 100 ml of dichloromethane was added and stirred for 5 minutes, the polymerization solution was separated into a water phase and an organic phase, the organic phase was neutralized with phosphoric acid and repeatedly rinsed with pure water until the pH of the rinsing solution became neutral. The concentration of the purified polycarbonate resin solution was 15 mass %.

The resulting polycarbonate resin solution was used to measure the viscosity-average molecular weight, which turned out to be 21,000.

(Impregnating and Drying Steps)

The resin solution obtained in the step of producing the polycarbonate resin solution was used to obtain a carbon fiber reinforced thermoplastic resin by operating in the same manner as Example 1.

The carbon fiber content (Vf) of the resulting carbon fiber reinforced thermoplastic resin was 47 vol %. The resulting carbon fiber reinforced thermoplastic resin was used to measure the dichloromethane content, which turned out to be 700 ppm by mass. The thickness of the resulting carbon fiber reinforced thermoplastic resin was 0.276 mm.

(Evaluation of Appearance Before Molding)

The resulting carbon fiber reinforced thermoplastic resin was observed with an optical microscope, where no whitening or lifting was found on the surface of the resin and thus the appearance was "good".

(Evaluation of Appearance after Molding)

The resulting carbon fiber reinforced thermoplastic resin was pressed at 100 kgf for 5 minutes while being heated at 265° C. to obtain a sheet for evaluating the appearance. No void was found in the resulting sheet for evaluating the appearance, and thus the appearance was "good". The results are summarized in Table 1.

(Evaluation of Amount of Heat Deformation)

Test pieces were cut out from the resulting carbon fiber reinforced thermoplastic resin, where the amount of heat deformation measured at 220° C. was 1 mm or less. The amount of heat deformation similarly measured at 230° C. was 2 mm. The amount of heat deformation similarly measured at 240° C. was 10 mm. The results are summarized in Table 2.

Example 6

(Step of Producing Polycarbonate Resin Solution)

75.6 g (0.2 mol) of 9,9-bis(4-hydroxy-3-methylphenyl)fluorene (BCFL) manufactured by Osaka Gas Chemicals, 58 g (0.2 mol) of 1,1-bis(4-hydroxyphenyl)-1-phenylethane (BPAP) manufactured by Honshu Chemical Industry and 0.3 g of hydrosulfite as an antioxidant were added to and dissolved in 720 ml of a 9 w/w % aqueous sodium hydroxide solution. To this, 400 ml of dichloromethane was added, and 53.3 g of phosgene was blown into the resultant by spending 40 minutes while stirring and keeping the solution temperature in a range of 15° C.–25° C.

After the phosgene blowing, a solution obtained by dissolving 1.55 g (0.01 mol) of p-tert-butylphenol into 50 ml of dichloromethane was added and vigorously stirred for emulsification. Thereafter, 0.3 ml of triethylamine as a polymerization catalyst was added to allow polymerization for about 40 minutes.

At the end of the polymerization, 170 ml of dichloromethane was fed and stirred for 5 minutes, the polymerization solution was separated into a water phase and an organic phase, the organic phase was neutralized with phosphoric acid and repeatedly rinsed with pure water until the pH of the rinsing solution became neutral. The concentration of the purified polycarbonate resin solution was 15 mass %.

The resulting polycarbonate resin solution was used to measure the viscosity-average molecular weight, which turned out to be 25,400.

(Impregnating and Drying Steps)

The resin solution obtained in the step of producing the polycarbonate resin solution was used to obtain a carbon fiber reinforced thermoplastic resin by operating in the same manner as Example 1

The carbon fiber content (Vf) of the resulting carbon fiber reinforced thermoplastic resin was 49 vol %. The resulting carbon fiber reinforced thermoplastic resin was used to measure the dichloromethane content, which turned out to be 650 ppm by mass. The thickness of the resulting carbon fiber reinforced thermoplastic resin was 0.263 mm.

(Evaluation of Appearance Before Molding)

The resulting carbon fiber reinforced thermoplastic resin was observed with an optical microscope, where no whitening or lifting was found on the surface of the resin and thus the appearance was "good".

(Evaluation of Appearance after Molding)

The resulting carbon fiber reinforced thermoplastic resin was pressed at 100 kgf for 5 minutes while being heated at 265° C. to obtain a sheet for evaluating the appearance. No void was found in the resulting sheet for evaluating the appearance, and thus the appearance was "good". The results are summarized in Table 1.

(Evaluation of Amount of Heat Deformation)

Test pieces were cut out from the resulting carbon fiber reinforced thermoplastic resin, where the amount of heat deformation measured at 200° C. was 1 mm or less. The amount of heat deformation similarly measured at 210° C. was 2 mm. The amount of heat deformation similarly measured at 220° C. was 4 mm. The amount of heat deformation similarly measured at 230° C. was 11 mm. The results are summarized in Table 2.

Example 7

(Step of Producing Polycarbonate Resin Solution)

52.8 g (0.15 mol) of bis(4-hydroxyphenyl)diphenylmethane (BPBP) manufactured by Honshu Chemical Industry, 43.5 g (0.15 mol) of 1,1-bis(4-hydroxyphenyl)-1-phenylethane (BPAP) manufactured by Honshu Chemical Industry and 0.3 g of hydrosulfite as an antioxidant were added to and dissolved in 600 ml of a 9 w/w % aqueous sodium hydroxide solution. To this, 380 ml of dichloromethane was added, and 41.5 g of phosgene was blown into the resultant by spending 30 minutes while stirring and keeping the solution temperature in a range of 15° C.–25° C.

After the phosgene blowing, a solution obtained by dissolving 1.28 g (0.0085 mol) of p-tert-butylphenol in 70 ml of dichloromethane was added and vigorously stirred for emulsification. Thereafter, 0.5 ml of triethylamine as a polymerization catalyst was added to allow polymerization for about 40 minutes.

At the end of the polymerization, the polymerization solution was separated into a water phase and an organic phase, the organic phase was neutralized with phosphoric acid and repeatedly rinsed with pure water until the pH of the rinsing solution became neutral. The concentration of the purified polycarbonate resin solution was 15 mass %.

The resulting polycarbonate resin solution was used to measure the viscosity-average molecular weight, which turned out to be 20,600.

(Impregnating and Drying Steps)

The resin solution obtained in the step of producing the polycarbonate resin solution was used to obtain a carbon fiber reinforced thermoplastic resin by operating in the same manner as Example 1.

The carbon fiber content (Vf) of the resulting carbon fiber reinforced thermoplastic resin was 52 vol %. The resulting carbon fiber reinforced thermoplastic resin was used to measure the dichloromethane content, which turned out to be 600 ppm by mass. The thickness of the resulting carbon fiber reinforced thermoplastic resin was 0.286 mm.

(Evaluation of Appearance Before Molding)

The resulting carbon fiber reinforced thermoplastic resin was observed with an optical microscope, where no whitening or lifting was found on the surface of the resin and thus the appearance was "good".

(Evaluation of Appearance after Molding)

The resulting carbon fiber reinforced thermoplastic resin was pressed at 100 kgf for 5 minutes while being heated at 265'C to obtain a sheet for evaluating the appearance. No void was found in the resulting sheet for evaluating the appearance, and thus the appearance was "good". The results are summarized in Table 1.

(Evaluation of amount of heat deformation)

Test pieces were cut out from the resulting carbon fiber reinforced thermoplastic resin, where the amount of heat deformation measured at 170° C. was 1 mm or less. The amount of heat deformation similarly measured at 180° C. was 2 mm. The amount of heat deformation similarly measured at 190° C. was 4 mm. The amount of heat deformation similarly measured at 195° C. was 9 mm. The amount of heat deformation similarly measured at 200° C. was 13 mm. The results are summarized in Table 2.

Comparative Example 1

(Step of Producing Polycarbonate Resin Solution)

7.5 kg (32.89 mol) of bisphenol A (BPA) manufactured by Nippon Steel and Sumikin Chemical and 30 g of hydrosulfite as an antioxidant were added to and dissolved in 54 kg of a 9 w/w % aqueous sodium hydroxide solution. To this, 40 kg of dichloromethane was added, and 4.4 kg of phosgene was blown into the resultant by spending 30 minutes while stirring and keeping the solution temperature in a range of 15° C.–25° C.

After the phosgene blowing, 2 kg of a 9 w/w % aqueous sodium hydroxide solution, 7.5 kg of dichloromethane, and a solution obtained by dissolving 193.5 g (1.29 mol) of p-tert-butylphenol in 1 kg of dichloromethane were added and vigorously stirred for emulsification. Thereafter, 10 ml of triethylamine as a polymerization catalyst was added to allow polymerization for about 40 minutes.

The polymerization solution was separated into a water phase and an organic phase, the organic phase was neutralized with phosphoric acid and repeatedly rinsed with pure water until the pH of the rinsing solution became neutral. The concentration of the purified polycarbonate resin solution was 15 mass %.

The resulting polycarbonate resin solution was used to measure the viscosity-average molecular weight, which turned out to be 21,500.

(Impregnating and Drying Steps)

A carbon fiber reinforced thermoplastic resin was obtained by using the resin solution obtained in the step of producing the polycarbonate resin solution and operating in the same manner as Example 1.

The carbon fiber content (Vf) of the resulting carbon fiber reinforced thermoplastic resin was 49 vol %. The resulting carbon fiber reinforced thermoplastic resin was used to measure the dichloromethane content, which turned out to be 50 ppm by mass. The thickness of the resulting carbon fiber reinforced thermoplastic resin was 0.265 mm.

(Evaluation of Appearance Before Molding)

The resulting carbon fiber reinforced thermoplastic resin was observed with an optical microscope, where whitening and lifting were found on the surface of the resin and thus the appearance was "poor".

(Evaluation of Appearance after Molding)

The resulting carbon fiber reinforced thermoplastic resin was pressed at 100 kgf for 5 minutes while being heated at 265° C. to obtain a sheet for evaluating the appearance. No void was found in the resulting sheet for evaluating the appearance, and thus the appearance was "good". The results are summarized in Table 1.

(Evaluation of Amount of Heat Deformation)

In order to improve the whitening of the surface of the resulting carbon fiber reinforced thermoplastic resin and the lifting in the resin, the resin was pressed at 100 kgf for 5 minutes while being heated at 265° C. Test pieces were cut out from the resulting sheet, where the amount of heat deformation measured at 140° C. was 1 mm or less. The amount of heat deformation similarly measured at 150° C. was 2 mm. The amount of heat deformation similarly measured at 160° C. was 8 mm. The results are summarized in Table 2.

Comparative Example 2

(Steps of Producing Polycarbonate Resin Solution, Impregnating and Drying)

A carbon fiber reinforced thermoplastic resin was obtained by using the polycarbonate resin solution obtained in Example 1 and by operating in the same manner as Example 1 except without drying in a hot air dryer.

The carbon fiber content (Vf) of the resulting carbon fiber reinforced thermoplastic resin was 45 vol %. The resulting carbon fiber reinforced thermoplastic resin was used to measure the dichloromethane content, which turned out to be 33,530 ppm by mass. The thickness of the resulting carbon fiber reinforced thermoplastic resin was 0.282 mm.

(Evaluation of Appearance Before Molding)

The resulting carbon fiber reinforced thermoplastic resin was observed with an optical microscope, where no whitening or lifting was found on the surface of the resin and thus the appearance was "good".

(Evaluation of Appearance after Molding)

The resulting carbon fiber reinforced thermoplastic resin was pressed at 100 kgf for 5 minutes while being heated at 265° C. to obtain a sheet for evaluating the appearance.

Voids were observed in the resulting sheet for evaluating the appearance, and thus the appearance was "poor". The results are summarized in Table 1.

Comparative Example 3

(Steps of Producing Polycarbonate Resin Solution, Impregnating and Drying)

A carbon fiber reinforced thermoplastic resin was obtained by using the polycarbonate resin solution obtained in Comparative example 1 and operating in the same manner as Comparative example 1 except that drying was conducted in a thermostatic chamber at 25° C. for 2 hours without drying in a hot air dryer.

The carbon fiber content (Vf) of the resulting carbon fiber reinforced thermoplastic resin was 58 vol %. The resulting carbon fiber reinforced thermoplastic resin was used to measure the dichloromethane content, which turned out to be 12,530 ppm by mass. The thickness of the resulting carbon fiber reinforced thermoplastic resin was 0.252 mm.

(Evaluation of Appearance Before Molding)

The resulting carbon fiber reinforced thermoplastic resin was observed with an optical microscope, where whitening and lifting were found on the surface of the resin and thus the appearance was "poor".

(Evaluation of Appearance after Molding)

The resulting carbon fiber reinforced thermoplastic resin was pressed at 100 kgf for 5 minutes while being heated at 265° C. to obtain a sheet for evaluating the appearance. Voids were observed in the resulting sheet for evaluating the appearance, and thus the appearance was "poor". The results are summarized in Table 1.

TABLE 1

| Example | Structure | Viscosity-average molecular weight | Drying conditions | Vf [%] | Dichloromethane content [mass ppm] | Thickness [min] | Evaluation of appearance Before molding | Evaluation of appearance After molding |
|---|---|---|---|---|---|---|---|---|
| Example 1 | BPAP | 21,000 | 25° C./5 hr, 100° C./2 hr | 51 | 440 | 0.283 | Good | Good |
| Example 2 | BPAP | 21,000 | 25° C./5 hr, 100° C./1 hr | 49 | 1,150 | 0.275 | Good | Good |
| Example 3 | BPAP | 21,000 | 25° C./5 hr, 100° C./10 min | 48 | 6,300 | 0.277 | Good | Good |
| Example 4 | BPZ | 21,200 | 25° C./5 hr, 100° C./2 hr | 53 | 550 | 0.261 | Good | Good |
| Example 5 | HPCD | 21,000 | 25° C./5 hr, 100° C./2 hr | 47 | 700 | 0.276 | Good | Good |
| Example 6 | BCFL/BPAP | 25,400 | 25° C./5 hr, 100° C./2 hr | 49 | 650 | 0.263 | Good | Good |
| Example 7 | BPBP/BPAP | 20,600 | 25° C./5 hr, 100° C./2 hr | 52 | 600 | 0.286 | Good | Good |
| Comparative example 1 | BPA | 21,500 | 25° C./5 hr, 100° C./2 hr | 49 | 50 | 0.265 | Poor | Good |
| Comparative example 2 | BPAP | 21,000 | 25° C./5 hr | 45 | 33,530 | 0.282 | Good | Poor |
| Comparative example 3 | BPA | 21,500 | 25° C./2 hr | 58 | 12,530 | 0.252 | Poor | Poor |

BPAP: 1,1-Bis(4-hydroxyphenyl)-1-phenylethane
BPZ: 1,1-Bis(4-hydroxyphenyl)cyclohexane
HPCD: 1,1-Bis(4-hydroxyphenyl)cyclododecane
BCFL: 9,9-Bis(4-hydroxy-3-methylphenyl)fluorene
BPBP: Bis(4-hydroxyphenyl)diphenylmethane
BPA: Bisphenol A

TABLE 2

| Example | Amount of heat deformation [mm] | | | | | | | | | | | |
|---|---|---|---|---|---|---|---|---|---|---|---|---|
| | 140° C. | 150° C. | 160° C. | 170° C. | 180° C. | 190° C. | 195° C. | 200° C. | 200° C. | 210° C. | 230° C. | 240° C. |
| Example 1 | — | — | — | 1 or less | 2 | 4 | 12 | — | — | — | — | — |
| Example 2 | — | — | — | — | — | — | — | — | — | — | — | — |
| Example 3 | — | — | — | — | — | — | — | — | — | — | — | — |
| Example 4 | — | — | 1 or less | 2 | 4 | 8 | 11 | — | — | — | — | — |
| Example 5 | — | — | — | — | — | — | — | — | — | 1 or less | 2 | 10 |
| Example 6 | — | — | — | — | — | — | — | 1 or less | 2 | 4 | 11 | — |
| Example 7 | — | — | — | 1 or less | 2 | 4 | 9 | 13 | — | — | — | — |
| Comparative example 1 | 1 or less | 2 | 8 | — | — | — | — | — | — | — | — | — |
| Comparative example 2 | — | — | — | — | — | — | — | — | — | — | — | — |
| Comparative example 3 | — | — | — | — | — | — | — | — | — | — | — | — |

The invention claimed is:

1. A sheet formed from a carbon fiber reinforced thermoplastic resin comprising carbon fibers, dichloromethane and a thermoplastic resin containing at least one of a polycarbonate resin and a polyarylate resin, wherein at least one of the polycarbonate resin and the polyarylate resin has a constituent unit derived from a dihydric phenol represented by General formula (1) below, and the content of dichloromethane contained in the sheet is 10-10,000 ppm by mass:

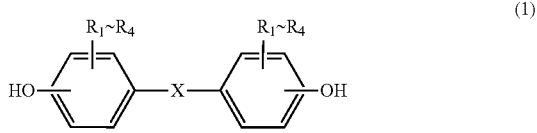

(1)

(in General formula (1), $R_1$-$R_4$ each independently represent hydrogen, a halogen, a nitro or a methyl group; and X represents a divalent group represented by any of Formulae (2) to (4) below),

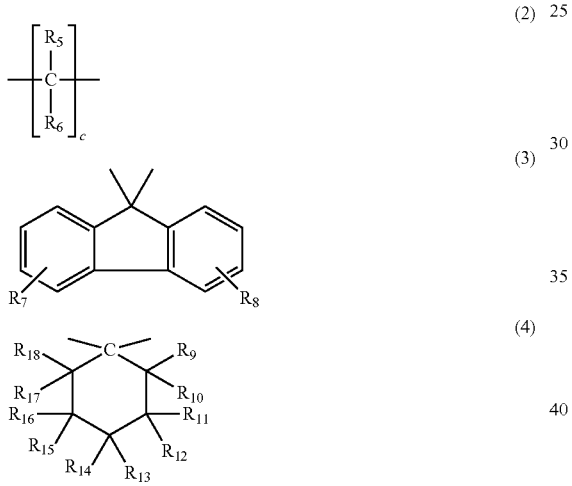

(in Formula (2), $R_5$ represents hydrogen, a halogen, an optionally substituted C1-C5 alkyl group, an optionally substituted C1-C5 alkoxy group, an optionally substituted C6-C12 aryl group, an optionally substituted C7-C17 aralkyl group or an optionally substituted C2-C5 alkenyl group while $R_6$ represents an optionally substituted C6-C12 aryl group or an optionally substituted C7-C17 aralkyl group, or $R_5$ and $R_6$ bond with each other to form a C5-C20 carbon ring; and c represents an integer of 1-5;

in Formula (3), $R_7$ and $R_8$ each independently represent hydrogen, a halogen, an optionally substituted C1-C5 alkyl group, an optionally substituted C1-C5 alkoxy group, an optionally substituted C6-C12 aryl group or an optionally substituted C7-C17 aralkyl group, or $R_7$ and $R_8$ bond with each other to form a C5-C20 carbon ring; and in Formula (4), $R_9$-$R_{18}$ each independently represent hydrogen or a C1-C3 alkyl group, where at least one of $R_9$-$R_{18}$ represents a C1-C3 alkyl group).

2. The sheet according to claim 1, wherein the carbon fibers are continuous fibers.

3. The sheet according to claim 1, wherein the sheet comprises the carbon fibers for 20-80 vol % and the thermoplastic resin for 80-20 vol %.

4. The sheet according to claim 1, wherein a viscosity-average molecular weight of the polycarbonate resin and the polyarylate resin is 10,000-100,000.

5. A laminate sheet obtained by laminating the sheet according to claim 1.

6. A method for producing a carbon fiber reinforced thermoplastic resin sheet, the method comprising:

producing a thermoplastic resin solution by an interfacial polymerization process by dissolving a thermoplastic resin containing at least one of a polycarbonate resin and a polyarylate resin in dichloromethane;

impregnating the thermoplastic resin solution into carbon fibers; and evaporating dichloromethane from the carbon fibers impregnated with the thermoplastic resin solution, wherein at least one of the polycarbonate resin and the polyarylate resin has a constituent unit derived from a dihydric phenol represented by General formula (1) below:

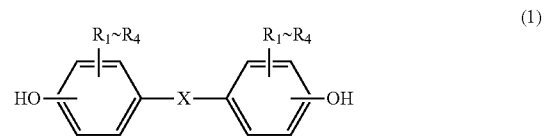

(1)

(in General formula (1), $R_1$-$R_4$ each independently represent hydrogen, a halogen, a nitro or a methyl group; and X represents a divalent group represented by any of Formulae (2) to (4) below):

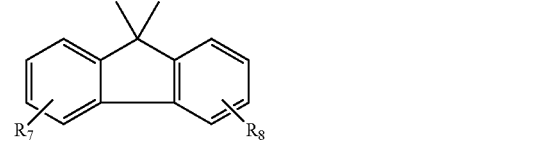

(in Formula (2), $R_5$ represents hydrogen, a halogen, an optionally substituted C1-C5 alkyl group, an optionally substituted C1-C5 alkoxy group, an optionally substituted C6-C12 aryl group, an optionally substituted C7-C17 aralkyl group or an optionally substituted C2-C5 alkenyl group while $R_6$ represents an optionally substituted C6-C12 aryl group or an optionally substituted C7-C17 aralkyl group, or $R_5$ and $R_6$ bond with each other to form a C5-C20 carbon ring; and c represents an integer of 1-5;

in Formula (3), R7 and R8 each independently represent hydrogen, a halogen, an optionally substituted C1-C5 alkyl group, an optionally substituted C1-C5 alkoxy group, an optionally substituted C6-C12 aryl group or an optionally substituted C7-C17 aralkyl group, or $R_7$ and $R_8$ bond with each other to form a C5-C20 carbon ring; and in Formula (4), R9-R18 each independently represent hydrogen or a C1-C3 alkyl group, where at least one of $R_9$-$R_{18}$ represents a C1-C3 alkyl group).

7. The production method according to claim 6, wherein a concentration of the polycarbonate resin and the polyarylate resin in the thermoplastic resin solution is 10-30 mass %.

* * * * *